(12) United States Patent
Plante et al.

(10) Patent No.: US 11,907,723 B2
(45) Date of Patent: Feb. 20, 2024

(54) OPERATION ELIMINATION

(71) Applicant: Arm Limited, Cambridge (GB)

(72) Inventors: Nicholas Andrew Plante, Austin, TX (US); Joseph Michael Pusdesris, Austin, TX (US); Jungsoo Kim, Sawston (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/699,326

(22) Filed: Mar. 21, 2022

(65) Prior Publication Data

US 2023/0297384 A1 Sep. 21, 2023

(51) Int. Cl.
*G06F 9/30* (2018.01)
*G06F 9/38* (2018.01)

(52) U.S. Cl.
CPC .......... *G06F 9/384* (2013.01); *G06F 9/30029* (2013.01); *G06F 9/30079* (2013.01); *G06F 9/30181* (2013.01)

(58) Field of Classification Search
CPC .. G06F 9/384; G06F 9/30029; G06F 9/30079; G06F 9/30181
See application file for complete search history.

(56) References Cited

U.S. PATENT DOCUMENTS

| | | | | |
|---|---|---|---|---|
| 6,094,716 A | * | 7/2000 | Witt | G06F 9/322 |
| | | | | 712/E9.034 |
| 9,454,371 B2 | * | 9/2016 | Madduri | G06F 9/384 |
| 10,417,001 B2 | * | 9/2019 | Combs | G06F 9/384 |
| 10,528,355 B2 | * | 1/2020 | Abernathy | G06F 9/30181 |
| 11,068,271 B2 | * | 7/2021 | Sundar | G06F 9/384 |
| 2014/0068230 A1 | * | 3/2014 | Madduri | G06F 9/30036 |
| | | | | 712/216 |
| 2014/0189324 A1 | * | 7/2014 | Combs | G06F 12/0292 |
| | | | | 712/225 |
| 2016/0026463 A1 | * | 1/2016 | Sundar | G06F 9/30032 |
| | | | | 712/208 |
| 2017/0185410 A1 | * | 6/2017 | Abernathy | G06F 9/30181 |
| 2019/0179640 A1 | * | 6/2019 | Silberman | G06F 9/3853 |
| 2020/0201632 A1 | | 6/2020 | Mekkat et al. | |
| 2021/0357216 A1 | | 11/2021 | Sperber et al. | |

OTHER PUBLICATIONS

Extended European Search Report for EP Application No. 23159845.9 dated Aug. 4, 2023, 9 pages.

* cited by examiner

*Primary Examiner* — Corey S Faherty
(74) *Attorney, Agent, or Firm* — NIXON & VANDERHYE P.C.

(57) ABSTRACT

A data processing apparatus is provided. Rename circuitry performs a register rename stage of a pipeline by storing, in storage circuitry, mappings between registers. Each of the mappings is associated with an elimination field value. Operation elimination circuitry replaces an operation that indicates an action is to be performed on data from a source register and stored in a destination register, with a new mapping in the storage circuitry that references the destination register and has the elimination field value set. Operation circuitry responds to a subsequent operation that accesses the destination register when the elimination field value is set; by obtaining contents of the source register, performing the action on the contents to obtain a result, and returning the result.

12 Claims, 7 Drawing Sheets

| | Mapping | Elimination field |
|---|---|---|
| x0 | | |
| x1 | | |
| x2 | | |
| x3 | | |
| x4 | p4 | 1 |
| x5 | p4 | 0 |
| x6 | | |
| ... | | |
| | | |
| | | |

Logical Register Table

FIG. 4

| | Mapping | Elimination field |
|---|---|---|
| x0 | | |
| x1 | | |
| x2 | | |
| x3 | | |
| x4 | p4 | 6 |
| x5 | p4 | 0 |
| x6 | | |
| . | | |
| . | | |
| . | | |
| | | |
| | | |

Logical Register Table

Actions:

0 – None
1 – NEG
2 – MVN
3 – RBIT
4 – REVW
5 – UXTW
6 – SXTW
.
.
.

OPERATION ELIMINATION

TECHNICAL FIELD

The present disclosure relates to data processing.

DESCRIPTION

In a data processing apparatus, an instruction queue is used to store instructions for which execution has not yet completed. The instructions within such an instruction queue might be reordered (i.e. executed out of order). However, reordering is typically limited to instructions within the queue itself, which has a finite capacity. Consequently, a greater flexibility can be achieved if entries into the instruction queue can be better managed.

SUMMARY

Viewed from a first example configuration, there is provided a data processing apparatus comprising: rename circuitry configured to perform a register rename stage of a pipeline by storing, in storage circuitry, mappings between registers, wherein each of the mappings is associated with an elimination field value; operation elimination circuitry configured to replace an operation that indicates an action is to be performed on data from a source register and stored in a destination register, with a new mapping in the storage circuitry that references the destination register and has the elimination field value set; and operation circuitry configured to respond to a subsequent operation that accesses the destination register when the elimination field value is set, by obtaining contents of the source register, performing the action on the contents to obtain a result, and returning the result.

Viewed from a second example configuration, there is provided a data processing method comprising: performing a register rename stage of a pipeline by storing, in storage circuitry, mappings between registers, wherein each of the mappings is associated with an elimination field value; replacing an operation that indicates an action is to be performed on data from a source register and stored in a destination register, with a new mapping in the storage circuitry that references the destination register and has the elimination field value set; and responding to a subsequent operation that accesses the destination register when the elimination field value is set, by obtaining contents of the source register, performing the action on the contents to obtain a result, and returning the result.

Viewed from a third example configuration, there is provided a non-transitory computer-readable medium to store computer-readable code for fabrication of a data processing apparatus comprising: rename circuitry configured to perform a register rename stage of a pipeline by storing, in storage circuitry, mappings between registers, wherein each of the mappings is associated with an elimination field value; operation elimination circuitry configured to replace an operation that indicates an action is to be performed on data from a source register and stored in a destination register, with a new mapping in the storage circuitry that references the destination register and has the elimination field value set; and operation circuitry configured to respond to a subsequent operation that accesses the destination register when the elimination field value is set, by obtaining contents of the source register, performing the action on the contents to obtain a result, and returning the result.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Before discussing the embodiments with reference to the accompanying figures, the following description of embodiments is provided.

In accordance with one example configuration there is provided a data processing apparatus comprising: rename circuitry configured to perform a register rename stage of a pipeline by storing, in storage circuitry, mappings between registers, wherein each of the mappings is associated with an elimination field value; operation elimination circuitry configured to replace an operation that indicates an action is to be performed on data from a source register and stored in a destination register, with a new mapping in the storage circuitry that references the destination register and has the elimination field value set; and operation circuitry configured to respond to a subsequent operation that accesses the destination register when the elimination field value is set, by obtaining contents of the source register, performing the action on the contents to obtain a result, and returning the result.

In these examples, the rename circuitry can be used to eliminate some operations from a stream of operations (e.g. instructions) without the effect of those operations being removed. That is, under normal circumstances, an operation would be entered into an instruction queue for execution by an execution unit. However, in these examples, the same effect of the execution unit can still be achieved without having to enter the operation into the instruction/issue queue. The notation made in the rename circuitry effectively causes the effect of the operation to be achieved at a later time when the register that was intended to hold the result of the operation is accessed. At this time, the source register that held the source of the operation is accessed, the action of the operation is performed, and the result is returned. The operation circuitry may be distinct from the execution unit. Indeed, in some situations, the operation circuitry may comprise a specialised unit that is designed to perform the action quickly, as opposed to the execution unit that may be more generalised and capable of performing multiple different actions (possibly in combination). As a result of this, the capacity of the instruction queue can be saved—these operations need not enter the instruction queue and so the limited capacity can result in a greater degree of reordering.

In some examples, the operation is replaced by inhibiting insertion of the operation into an instruction queue. Thus, the operation does not progress into the instruction queue (e.g. an issue queue) and so occupies no space within the instruction queue. This in turn expands the effective range over which, for instance, reordering of instructions can be performed in order to enable out of order execution to operate over a larger space.

In some examples, the operation circuitry is configured to respond to the subsequent operation that accesses the destination register when the elimination field value is unset, by returning the contents of the source register. When the elimination field in the rename circuitry is unset for a particular destination register, the action is not performed. Thus, the elimination field controls whether or not the action is performed when the destination register is accessed.

In some examples, the mappings are from logical registers to physical registers; and the new mapping references one of the physical registers corresponding with the source register; and the destination register is one of the logical registers. Typically, the rename stage of a pipeline is used to provide mappings between physical registers (those that actually physically exist in hardware) and logical registers (those that exist in a 'virtual' form). Instructions will typically refer to virtual registers and these will be assigned to physical registers by the rename stage as required. By carefully assigning physical registers to logical registers, it is possible to eliminate false dependencies to instructions, which allows instruction parallelism to take place. The rename stage would ordinarily cause the operation to read the associated physical register and assign a physical register to store the result. However, instead, the storage circuitry used to store the mappings between physical and logical registers stores the fact that the logical destination register maps to the physical source register. That way, when a subsequent instruction wishes to access the destination register (at which it expects the result of the operation to be stored) it will actually access the physical register that contained the source of the operation to be performed. Obviously this data is not what would be expected. Consequently, an elimination field value is set to indicate that the action of the operation must still be performed, and this action is performed before the resulting data is passed on.

In some examples, the elimination field value indicates which of a plurality of actions is to be performed. In these examples, it is possible for a number of different actions to be performed. That is, a number of different operations can be eliminated.

The elimination field value therefore indicates which of the operations is to be performed when the destination register is accessed by the subsequent operation.

In some examples, the operation references zero further source registers. That is, the operation references exactly one source register. The operation may also reference one or more destination registers and may include control information.

In some examples, the operation circuitry is configured to perform the action on the contents in one clock cycle. The action is therefore particularly quick to perform, and hence can be performed 'on demand' when a request is made to access the destination register. This is not to say that the entirety of the clock cycle is occupied by these acts. On the contrary, these acts might take up only a fraction of the clock cycle, enabling other actions to be performed in addition to those listed.

In some examples, the operation circuitry is configured to perform the action on the contents without using logic gates. In these embodiments, the action is instead performed using, for instance, wiring so as to move bits around. In some examples, logic gates are included, but only NOT gates that invert a bit (e.g. produce a '1' when a '0' is input and produce a '0' when a '1' is input).

In some examples, the operation is from the list comprising: bitwise NOT, negate-and-shift, reverse bits, reverse bytes, unsigned extension, and sign extension. A bitwise NOT operation takes a series of bits as an input and produces an output in which each bit in the input has been inverted. A negate-and-shift operation performs the same thing, but performs a left or right shift of the input before the negation takes place. A bit reversal takes a series of bits and reverses the order so that the least significant bits become the most significant bits and vice-versa. A byte reversal operation considers an input as a series of bytes (e.g. groups of 8 bits). Each group of bits is then reversed, with the bits within each group remaining in order. Unsigned extension treats the contents of a register as positive and extends the number (e.g. by padding it with 0s in a most significant position). Signed extension takes a value having a certain number of bits and represents the same number using a larger number of bits. The input and output are signed and therefore could be positive or negative. For a positive number, this is achieved by padding with 0s at a most significant bit position. For a negative number, the process involves padding with 1s at a most significant bit position. In each case, the action to be performed is dictated by and corresponds with the operation to be performed.

In some examples, the operation is an extension operation. This could be a sign extension operation or an unsinged extension operation.

In some examples, the source register and the destination register have different widths. For example, the source register might have a smaller number of bits that the destination register and thus be capable of representing a smaller range of numbers than the destination register.

Particular embodiments will now be described with reference to the figures.

Figure 1:
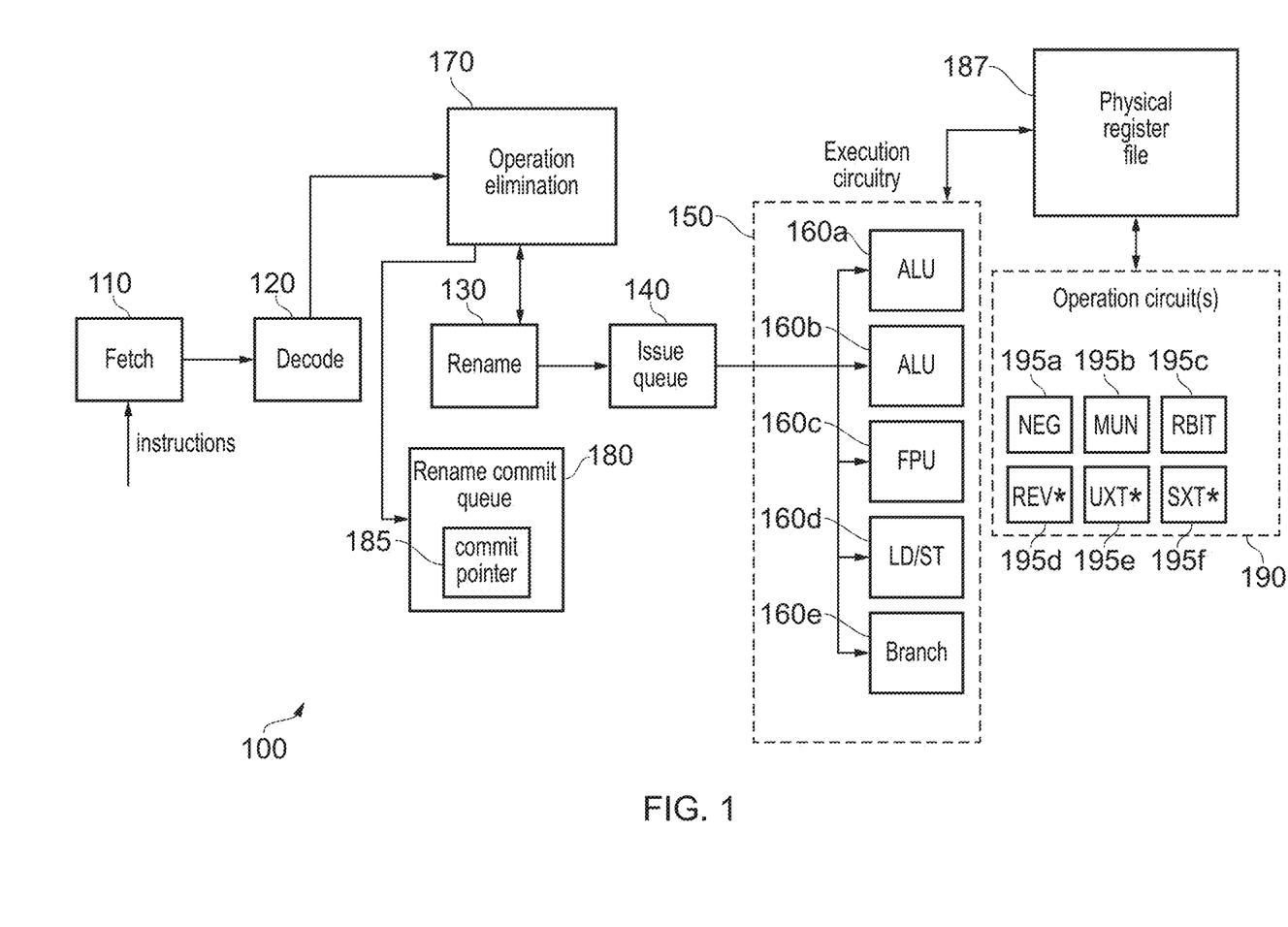
FIG. 1 schematically illustrates a data processing apparatus.

FIG. 1 schematically illustrates a data processing apparatus 100. The data processing apparatus 100 includes fetch circuitry 110, which is responsible for fetching instructions from memory (either from a main memory or from a memory via a cache). The retrieved instructions are passed to decode circuitry 120 that generates one or more operations in response to instructions. Operation elimination circuitry 170 is provided in order to eliminate certain operations (e.g. instructions) using the rename circuitry 130. This will be discussed in more detail below. From here, the operations are passed to a commit queue 180. The commit queue 180 keeps track of the order in which the instructions are received so that if they are executed in a different order, they are committed (e.g. the execution is completed) in the same order that the instructions are received in, thereby providing data integrity. At the same time, the operations corresponding to the instructions are passed to rename circuitry 130 where register renaming takes place. Register renaming can incorporate a number of different techniques but generally enables the idea of 'logical registers' that map to real physical registers (that forms part of a physical register file 187) to enable the removal of false dependencies between instructions. Register renaming also allows for operation elimination as will be detailed below. Issue circuitry 140 is provided to issue the operations to execution circuitry 150. In practice, the issue circuitry 140 acts as a set of queues for instructions (operations) to reside, until they are passed on execution circuitry 150.

The execution circuitry may be made up of a number of execution units such as an arithmetic logic unit (ALU) 160*a*, a second ALU 160*b*, which is provided to enable multiple arithmetic operations to take place simultaneously, a floating point unit (FPU) 160*c*, a load/store unit 160*d*, and a branch unit 160*e*. Other examples of execution units will be known to the skilled person. These execution units receive the operations and perform one or more functions based on those operations. When the operations are completed, they are committed with reference to the commit queue 180 so that even if the instructions are executed out-of-order, they are committed in the order in which they appear from the decode circuitry. A commit pointer 185 is provided in the commit queue 180 to track the next instruction that is to be committed. This pointer is incremented each time an instruction in the commit queue is committed.

These examples additionally use operation circuit(s) 190, which can be used to perform a limited set of actions that can be performed by the execution circuitry 150. The operation circuit 190 or circuits 190 can be used in combination with the rename circuitry 130 to enable the operation elimination circuitry 170 to eliminate some operations.

In this example, the operation circuits 190 include a negation circuit 195, a move negate circuit (which performs a negation and/or shift) 195*h*, a reverse bit circuit 195*c* that reverses the order of bits, a reverse byte circuit 195*d* that reverses the byte order, an unsigned extension circuit 195*e* and a signed extension circuit 195*f*. Note that in this example, the byte reversal circuit 195*d*, the unsigned extension circuit 195*e*, and the signed extension circuit 195*f* are all suffixed with a * to indicate that they may perform the specified operations for different data lengths (e.g. words, half words, and so on).

Figure 2:
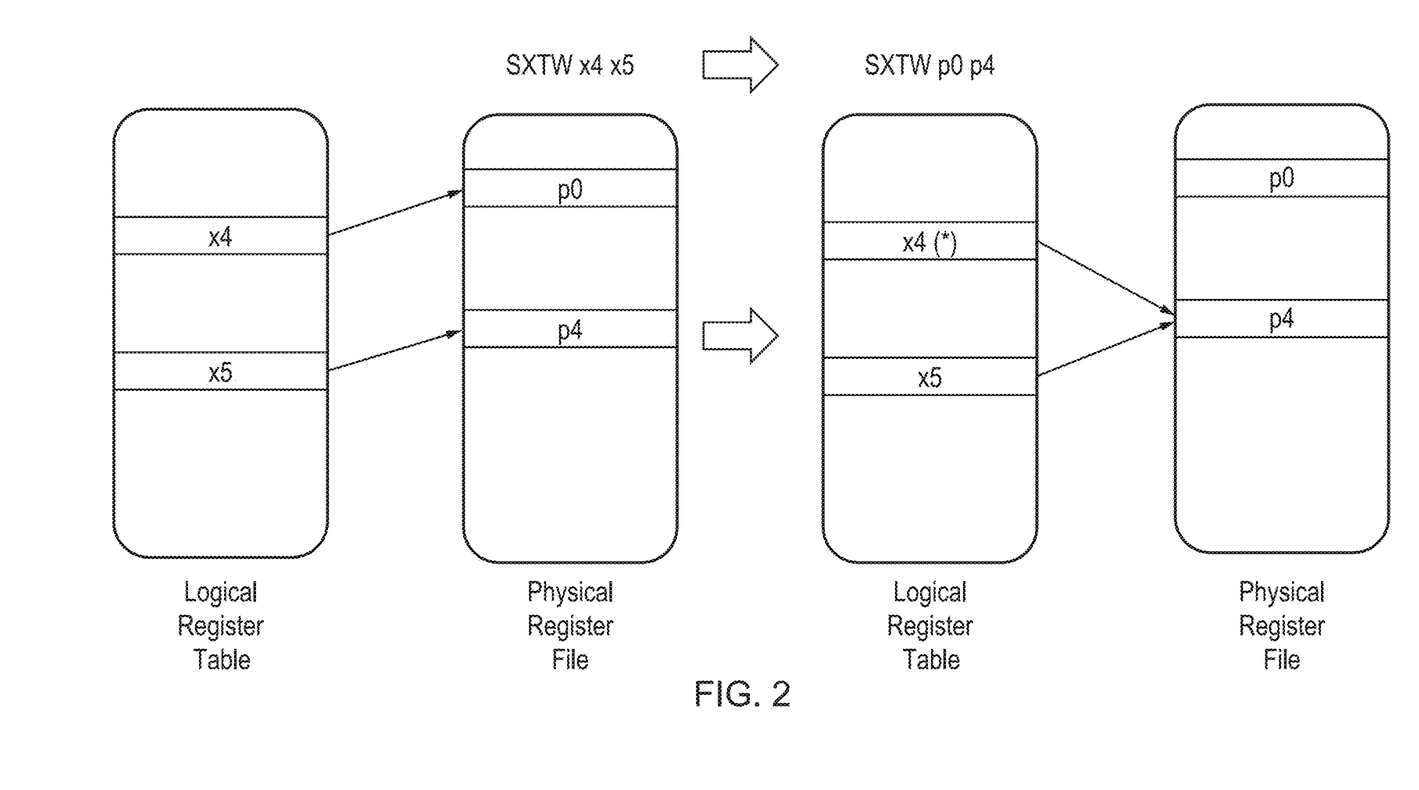
FIG. 2 illustrates the process of operation elimination for the example of a sign extension instruction.

FIG. 2 illustrates the process of operation elimination for the example of a sign extension instruction (SXTW) performs a 2*s* complement sign extension operation on 32 bits of the contents of a source register to create a 64-bit sign extended integer value, which is then placed in a destination register. In effect, this process copies the top bit of the source register to use as padding in the destination register. For instance, sign extending the four bit 2s complement encoding 1101 (−2 in decimal) to an 8-bit value produces 11111101 as the bit (1) in the third bit position is copied to bit positions 4, 5, 6, and 7 of the output. This operation can be achieved without logic gates—merely with wiring. Traditionally, this operation might be performed by the ALU execution unit 160*a*. Of course, such an operation utilises power and bandwidth as a consequence of the operation being performed by the ALU and so the overall throughput of instructions through the pipeline can be reduced.

Operation elimination recognises that when register renaming is available, it might be possible to eliminate certain operations from being performed. Instead, one can simply update the mapping between logical and physical registers and add an indication that the operation is to be performed at a later time.

Such an example is shown in FIG. 2. Here, the logical register x4 initially points to a physical register p0 and the logical register x5 initially points to a physical register p4. The instruction SXTW x4 x5 sign extends a value stored in a logical register x5 and stores the result in a logical register x4 This instruction is decoded (e.g. by decode stage 120) and renaming is performed (e.g. by renaming stage 130) and physical registers are thereby assigned to the operation, thus resulting in the operation SXTW p0 p4.

The resulting operation can be achieved using an ALU 160*a* as described above. However, the present technique offers a faster way of achieving this, without the operation having to be provided to an instruction queue. In particular, the logical register table is updated (as shown on the right of FIG. 2) so that the logical register x4 (where the result of the SXTW operation would have been stored) instead points to the source of that operation (physical register p4). In addition, a note is made (indicated by the asterisk *) that if and when logical register x4 is accessed, the sign extension is required to take place on the data stored in register p4. In these examples, the late sign extension can be performed by one of the operation units 190 and so this operation does not require the use of any of the execution units 150. The average instruction execution rate is therefore increased.

Figure 3:
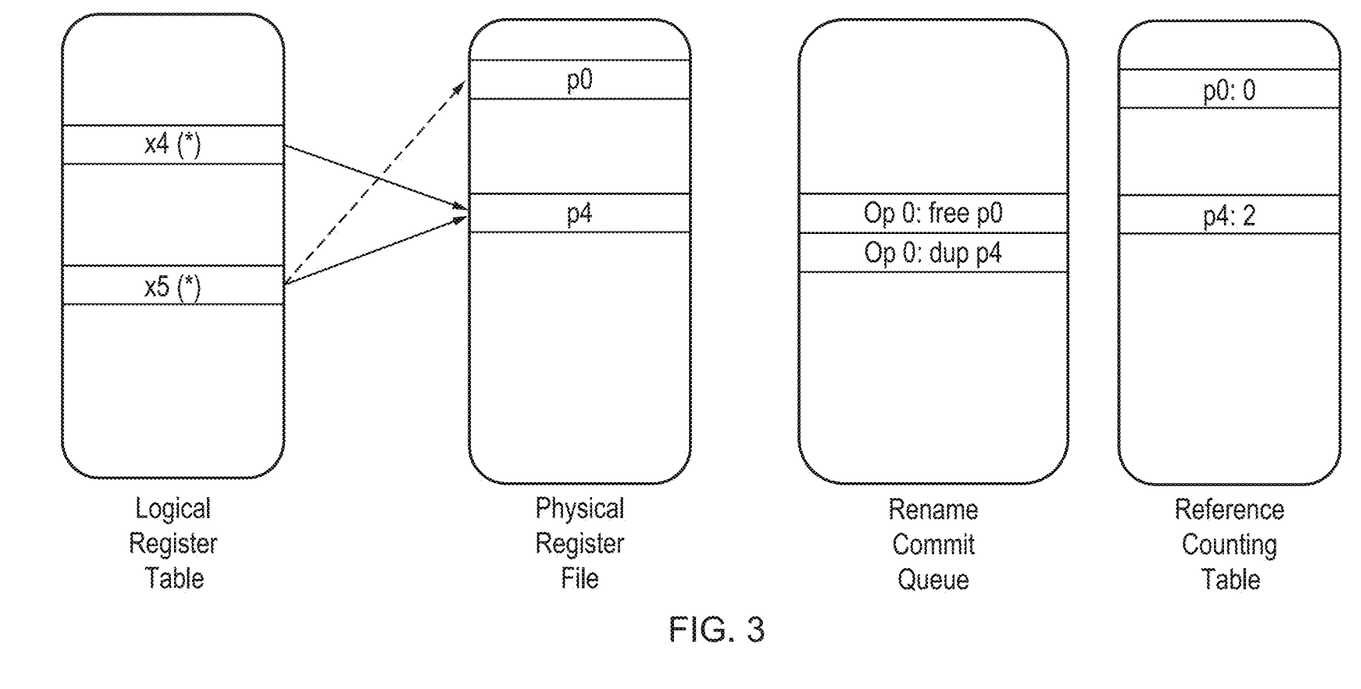
FIG. 3 further illustrates the process of operation elimination.

As shown in FIG. 3, the operation elimination illustrated in FIG. 2 causes two entries to be stored in the rename commit queue (RCQ) The RCQ is used during the commit phase of instructions and is also used in the event of a pipeline flush in order to 'rewind' the instruction stream. Also as shown in FIG. 3, it may be necessary to perform reference counting to make sure that the physical register (p4) is not reclaimed until both of the logical registers (x4 and x5) finish using that physical register. Hence, an entry is stored in a reference counting table to indicate that two logical registers refer to physical register p4 and zero logical registers refer to p0. Physical register p0 is therefore such that it can be reclaimed. When one of the logical registers stops referring to register p4 (e.g. if the value is changed) then the reference count for p4 in the reference counting table can be reduced.

Figure 4:
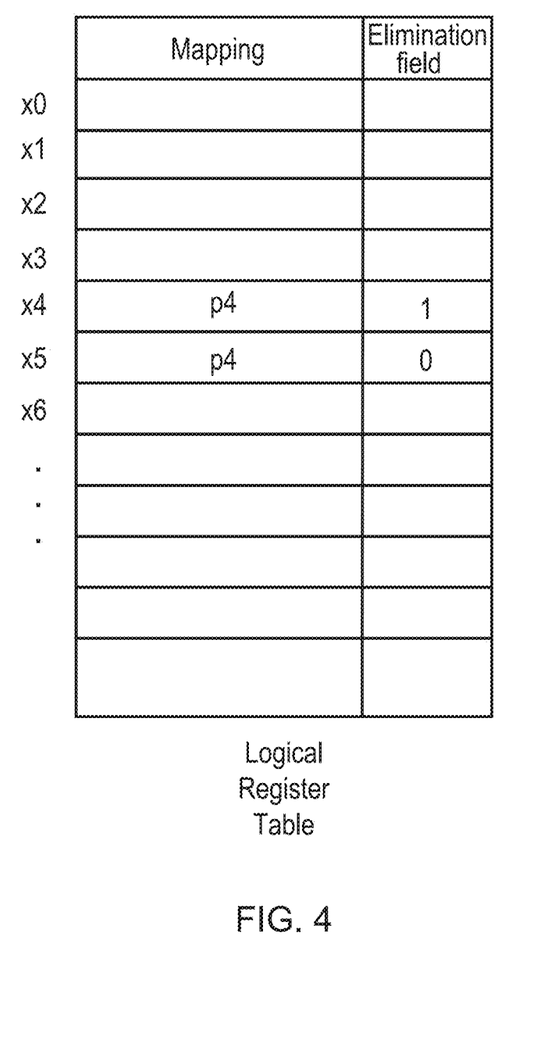
FIG. 4 shows an example of the logical register table, which is an example of the claimed storage circuitry used by the data processing apparatus.

FIG. 4 shows an example of the logical register table, which is an example of the claimed storage circuitry used by the data processing apparatus 100. The logical register table is used to store mappings between logical registers and physical registers. In this example, for instance, it can be seen that the logical register x4 is mapped to the physical register p4 and the logical register x5 is mapped to the logical register p4 as well (as is the result at the end of the FIGS. 2/3). Consequently, when a decoded instruction refers to a logical register (e.g. x4) it is known that the corresponding physical register p4 should be accessed from the register file 187 to perform the operation.

In these examples, the logical register table also includes an elimination field with a corresponding value for each mapping. The field indicates whether an action corresponding to the eliminated operation should be performed when the logical register is accessed. Taking again the example of FIGS. 2/3, recall that the sign extension operation SXTW was eliminated (i.e. not entered into the instruction queue 140) and instead, the logical register table was updated so that register x4, which was to be the destination of the sign extension referred to the physical source register p4 of that operation. This of course is not sufficient on its own, because accessing physical register p4 will not produce the value corresponding with the sign extension. The sign extension is still to be performed on the value stored in physical register p4. The elimination field value for register x4 is therefore set (i.e. its value is set to '1') so that when the physical register p4 is accessed, the sign extension operation is performed on the data from that register.

This is achieved by the operation circuit(s) 190 shown in FIG. 1 specifically the sign extension unit 195*f*. That is, when register x4 is accessed by a subsequent operation, it is noted that the corresponding elimination field value for register x4 is set. Thus, the contents of physical register p4 (to which x4 points) are accessed and passed through the sign extension unit 195f before any further operations are performed on that data. Since sign extension can be achieved by wiring re, not through the use of any logic gates), the sign extension action can be performed very quickly and certainly the result of this action can be performed and passed on within a single clock cycle.

It will therefore be appreciated that, in the example of FIG. 4, the elimination field value is set for x4 but not for x5. Thus, when x4 is accessed, the sign extension is not performed but the sign extension is performed when x5 is accessed. This is because, according to the operation that was eliminated, it is only the contents of x5 and not x4 that have the sign extension performed.

Figure 5:
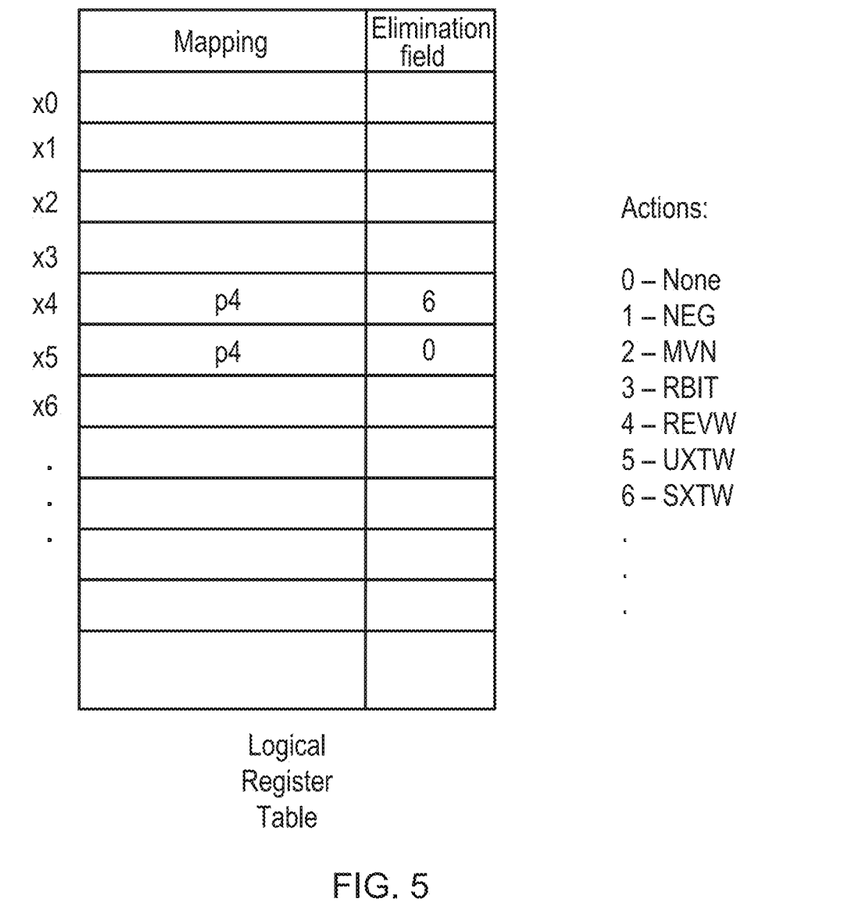
FIG. 5 illustrates a variant in which a number of different operations can be eliminated.

FIG. 5 illustrates a variant in which a number of different operations can be eliminated. In this example, the elimination field indicates which of several corresponding actions are to be performed. That is, if a NEG operation is eliminated, then the contents of the source register for that operation are to be passed through a NEG operation circuit 195a. This is notated (in the example of FIG. 5) by recording the value in the elimination field for that register. Similarly, if a MVN operation is eliminated, then the contents of the source register for that operation are to be passed through an MVN operation circuit 195b. This is notated by (in the example of FIG. 5) by recording the value '2' in the elimination field for that register. The value '0' is, in this case, reserved for the situation where no action is to be performed. That is, the value of the source register is taken verbatim without being passed through the operation circuit(s).

Note that although some of the operation circuits can be implemented without the use of logic gates, some other operation circuits require the use of a negation logic gate (e.g. a NOT gate). Typically, NOT gates operate quickly, and so the results of applying a NOT gate to a source register can be performed within one clock cycle, and the result passed to another operation. Of course, in other embodiments, it might be acceptable for the source operand to take more than one processor cycle to be operated on by the operation circuit(s) before being passed on to a further operation.

As a consequence of eliminating operations in this way, the eliminated operations need not be passed on to the instruction/issue queue 140 (since there is no operation to be performed). This in turn expands the reordering capability of the issue queue 140.

Figure 6A:
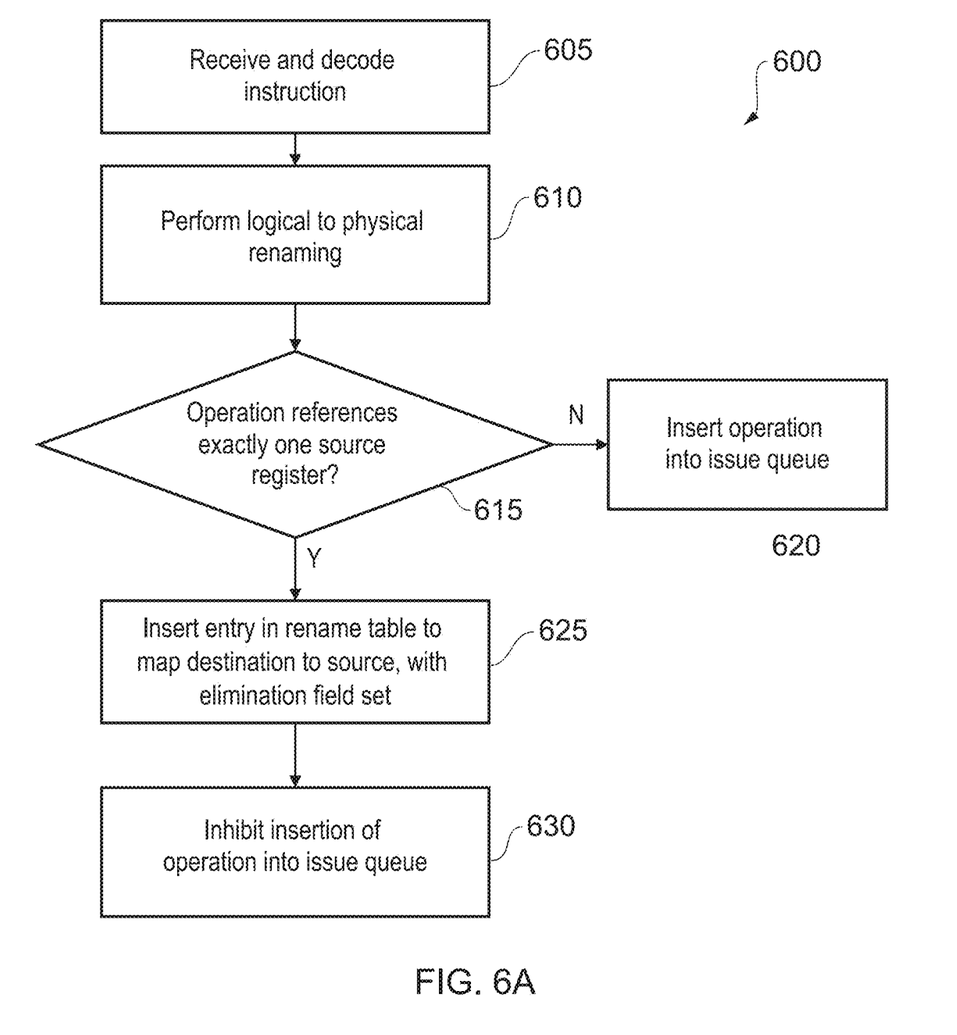
FIG. 6A illustrates a flowchart that shows a process of eliminating the operations in accordance with some embodiments.

FIG. 6A illustrates a flowchart 600 that shows a process of eliminating the operations in accordance with some embodiments. At a step 605, an instruction is received and decoded into an operation (e.g. by fetch circuitry 110 and decode circuitry 120). At a step 610, any logical to physical renaming that is to occur takes place. At a step 615, it is determined whether the operation references exactly one source register (such that the operation can be eliminated by the use of the rename circuitry 130). If not, then the operation is inserted into the issue/instruction queue 140. Otherwise, at step 625, an entry is inserted into the rename table (e.g. the logical register table) to map the logical destination register to the physical source register and, within that mapping, to set the elimination field. Where multiple operations can be eliminated, the elimination field is set to correspond with the operation that was eliminated. Then, at step 630, any insertion of the operation into the issue/instruction queue is inhibited. That is, the operation is not inserted.

Figure 6B:
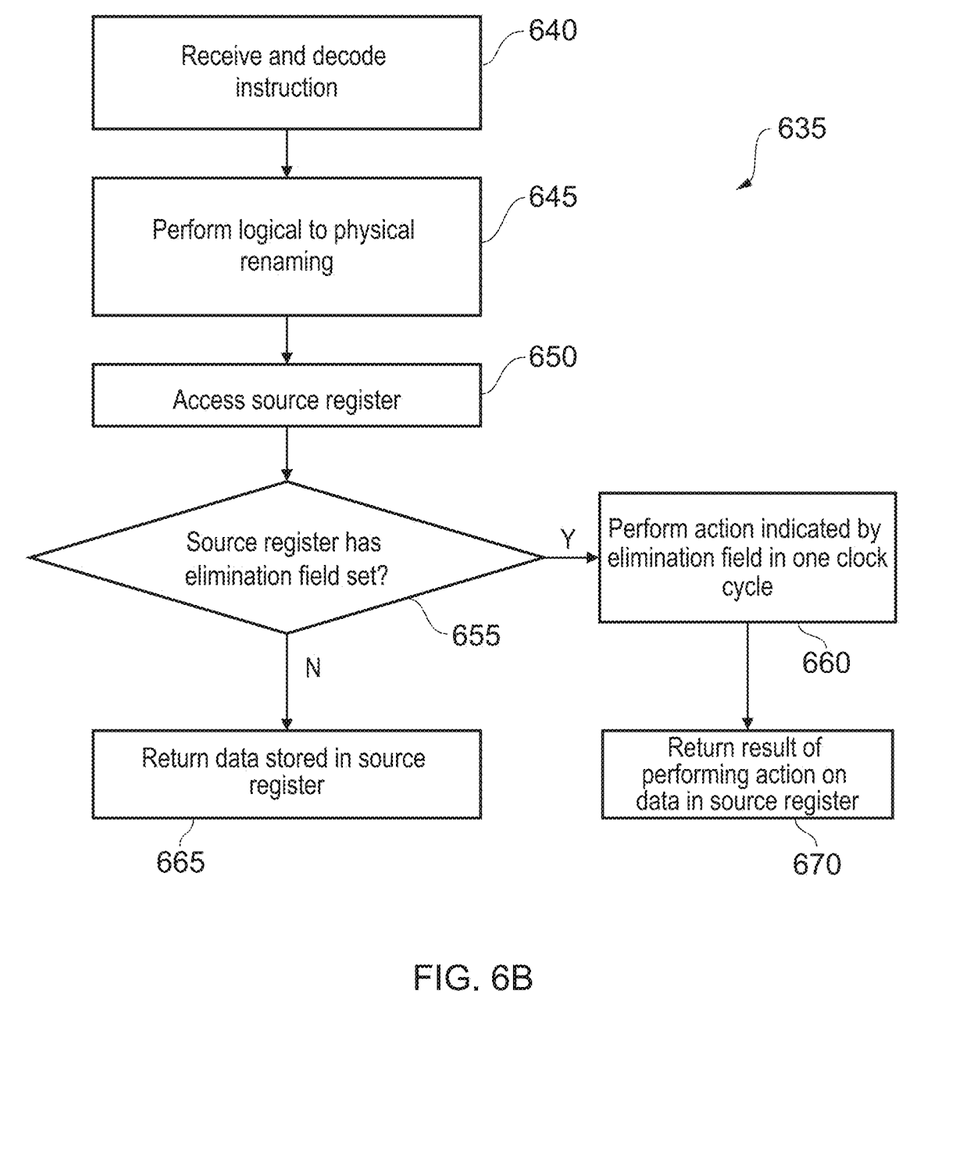
FIG. 6B illustrates a flowchart that shows the process of compensating for the eliminated operation when a subsequent operation seeks to use the data stored in the destination register of the operation that was eliminated.

FIG. 6B illustrates a flowchart 635 that shows the process of compensating for the eliminated operation when a subsequent operation seeks to use the data stored in the destination register of the operation that was eliminated. At step 640, the instruction is received and decoded. At step 645, any logical to physical renaming takes place. These steps take place in a similar way as for the steps 605, 610 previously described with reference to the first flow chart 600. At a step 650, the (physical) source register for the subsequent operation is accessed. At a step 655, it is determined whether the logical source register has the elimination field set. If not, then the value in the (physical) source register is returned at step 665. Otherwise, at step 660, the action indicated in the elimination field is performed on the data stored in the physical source register. In this example, the action is performed in a single clock cycle. Then, the result of performing that action is returned at step 670.

Concepts described herein may be embodied in computer-readable code for fabrication of an apparatus that embodies the described concepts. For example, the computer-readable code can be used at one or more stages of a semiconductor design and fabrication process, including an electronic design automation (FDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed fir the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk or optical disc. An integrated circuit fabricated using the computer-readable code may comprise components such as one or more of a central processing unit, graphics processing unit, neural processing unit, digital signal processor or other components that individually or collectively embody the concept.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

Other aspects and features of the invention are set out in the following numbered clauses:

1. A data processing apparatus comprising:
   rename circuitry configured to perform a register rename stage of a pipeline by storing, in storage circuitry, mappings between registers, wherein each of the mappings is associated with an elimination field value;
   operation elimination circuitry configured to replace an operation that indicates an action is to be performed on data from a source register and stored in a destination register, with a new mapping in the storage circuitry that references the destination register and has the elimination field value set; and
   operation circuitry configured to respond to a subsequent operation that accesses the destination register when the elimination field value is set, by obtaining contents of the source register, performing the action on the contents to obtain a result, and returning the result.
2. The data processing apparatus according to clause 1, wherein
   the operation is replaced by inhibiting insertion of the operation into an instruction queue.
3. The data processing apparatus according to any preceding clause, wherein
   the operation circuitry is configured to respond to the subsequent operation that accesses the destination register when the elimination field value is unset, by returning the contents of the source register.
4. The data processing apparatus according to any preceding clause, wherein
   the mappings are from logical registers to physical registers; and
   the new mapping references one of the physical registers corresponding with the source register; and
   the destination register is one of the logical registers.
5. The data processing apparatus according to any preceding clause, wherein
   the elimination field value indicates which of a plurality of actions is to be performed.
6. The data processing apparatus according to any preceding clause, wherein
   the operation references zero further source registers.
7. The data processing apparatus according to any preceding clause, wherein
   the operation circuitry is configured to perform the action on the contents in one clock cycle.
8. The data processing apparatus according to any preceding clause, wherein
   the operation circuitry is configured to perform the action on the contents without using logic gates.
9. The data processing apparatus according to any preceding clause, wherein
   the operation is from the list comprising: bitwise NOT, negate-and-shift, reverse bits, reverse bytes, unsigned extension, and sign extension.
10. The data processing apparatus according to any preceding clause, wherein
    the operation is an extension operation.
11. The data processing apparatus according to any preceding clause, wherein
    the source register and the destination register have different widths.
12. A data processing method comprising:
    performing a register rename stage of a pipeline by storing, in storage circuitry, mappings between registers, wherein each of the mappings is associated with an elimination field value;
    replacing an operation that indicates an action is to be performed on data from a source register and stored in a destination register, with a new mapping in the storage circuitry that references the destination register and has the elimination field value set; and
    responding to a subsequent operation that accesses the destination register when the elimination field value is set, by obtaining contents of the source register, performing the action on the contents to obtain a result, and returning the result.
13. A non-transitory computer-readable medium to store computer-readable code for fabrication of a data processing apparatus comprising:
    rename circuitry configured to perform a register rename stage of a pipeline by storing, in storage circuitry, mappings between registers, wherein each of the mappings is associated with an elimination field value;
    operation elimination circuitry configured to replace an operation that indicates an action is to be performed on data from a source register and stored in a destination register, with a new mapping in the storage circuitry that references the destination register and has the elimination field value set; and
    operation circuitry configured to respond to a subsequent operation that accesses the destination register when the elimination field value is set, by obtaining contents of the source register, performing the action on the contents to obtain a result, and returning the result.

We claim:

1. A data processing apparatus comprising:
rename circuitry configured to perform a register rename stage of a pipeline by storing, in storage circuitry, mappings between registers, wherein each of the mappings is associated with an elimination field value;
operation elimination circuitry configured to replace an operation that indicates an action is to be performed on data from a source register and stored in a destination register, with a new mapping in the storage circuitry that references the destination register and has the elimination field value set; and
operation circuitry configured to respond to a subsequent operation that accesses the destination register while the elimination field value is set, by obtaining contents of the source register, performing the action on the contents to obtain a result, and returning the result, wherein
the elimination field value indicates which of a plurality of actions is to be performed.

2. The data processing apparatus according to claim 1, wherein
the operation is replaced by inhibiting insertion of the operation into an instruction queue.

3. The data processing apparatus according to claim 1, wherein
the operation circuitry is configured to respond to the subsequent operation that accesses the destination register while the elimination field value is unset, by returning the contents of the source register.

4. The data processing apparatus according to claim 1, wherein
the mappings are from logical registers to physical registers; and
the new mapping references one of the physical registers corresponding with the source register; and
the destination register is one of the logical registers.

5. The data processing apparatus according to claim 1, wherein
the operation references zero further source registers.

6. The data processing apparatus according to claim 1, wherein
the operation circuitry is configured to perform the action on the contents in one clock cycle.

7. The data processing apparatus according to claim 1, wherein
the operation circuitry is configured to perform the action on the contents without using logic gates.

8. A data processing apparatus comprising:
rename circuitry configured to perform a register rename stage of a pipeline by storing, in storage circuitry, mappings between registers, wherein each of the mappings is associated with an elimination field value;
operation elimination circuitry configured to replace an operation that indicates an action is to be performed on data from a source register and stored in a destination register, with a new mapping in the storage circuitry that references the destination register and has the elimination field value set; and
operation circuitry configured to respond to a subsequent operation that accesses the destination register while the elimination field value is set, by obtaining contents of the source register, performing the action on the contents to obtain a result, and returning the result, wherein
the operation is from the list comprising: bitwise NOT, negate-and-shift, reverse bits, reverse bytes, unsigned extension, and sign extension.

9. The data processing apparatus according to claim 1, wherein
the operation is an extension operation.

10. The data processing apparatus according to claim 1, wherein
the source register and the destination register have different widths.

11. A data processing method comprising:
performing a register rename stage of a pipeline by storing, in storage circuitry, mappings between registers, wherein each of the mappings is associated with an elimination field value;
replacing an operation that indicates an action is to be performed on data from a source register and stored in a destination register, with a new mapping in the storage circuitry that references the destination register and has the elimination field value set; and
responding to a subsequent operation that accesses the destination register while the elimination field value is set, by obtaining contents of the source register, performing the action on the contents to obtain a result, and returning the result, wherein
the operation is from the list comprising: bitwise NOT, negate-and-shift, reverse bits, reverse bytes, unsigned extension, and sign extension.

12. A non-transitory computer-readable medium to store computer-readable code for fabrication of a data processing apparatus comprising:
rename circuitry configured to perform a register rename stage of a pipeline by storing, in storage circuitry, mappings between registers, wherein each of the mappings is associated with an elimination field value;
operation elimination circuitry configured to replace an operation that indicates an action is to be performed on data from a source register and stored in a destination register, with a new mapping in the storage circuitry that references the destination register and has the elimination field value set; and
operation circuitry configured to respond to a subsequent operation that accesses the destination register while the elimination field value is set, by obtaining contents of the source register, performing the action on the contents to obtain a result, and returning the result, wherein
the operation is from the list comprising: bitwise NOT, negate-and-shift, reverse bits, reverse bytes, unsigned extension, and sign extension.

* * * * *